Sept. 6, 1927.
J. P. HEIL
1,641,486
GEAR PUMP OILER
Filed Dec. 19, 1924
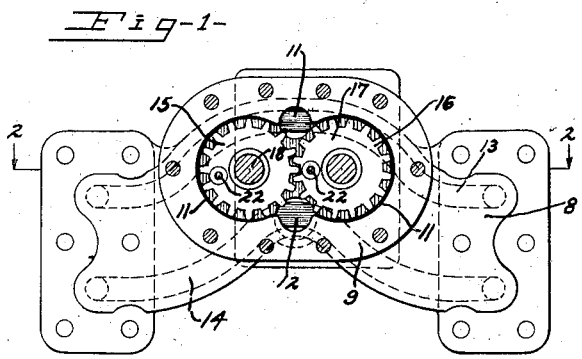
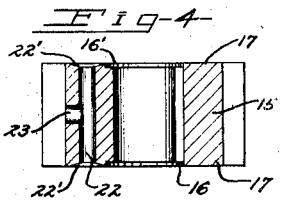
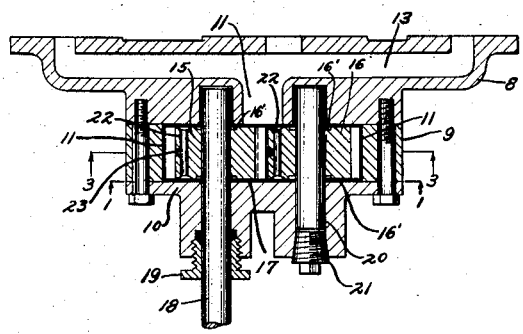
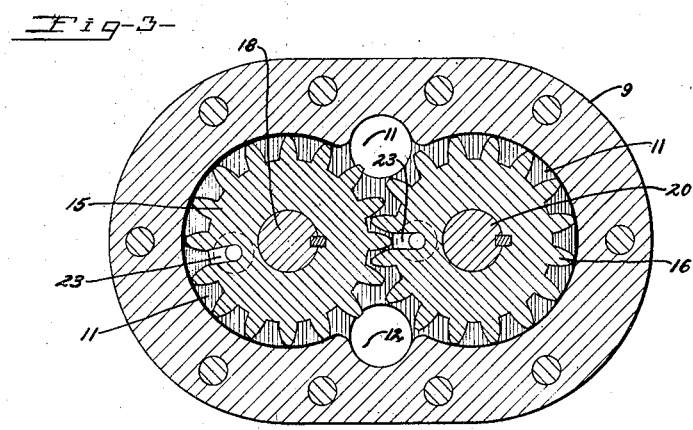
INVENTORS.
Julius P. Heil
BY
Morsell, Keeney & Morsell,
ATTORNEYS Patented Sept. 6, 1927.

1,641,486

UNITED STATES PATENT OFFICE.

JULIUS P. HEEL, OF MILWAUKEE, WISCONSIN, ASSIGNOR TO THE HEIL CO., OF MILWAUKEE, WISCONSIN, A CORPORATION OF WISCONSIN.

GEAR-PUMP OILER.

Application filed December 19, 1924. Serial No. 757,027.

This invention relates to improvements in pump oiler.

Gear pumps in many cases, and more particularly when in use with hydraulic dump carts, have considerable end thrust and unless means are provided for positively lubricating the ends of the pump gears, excessive wear is caused thereon and also on the gear casing with the result that they soon start to leak between the ends of the gears and the casing and lose their efficiency.

It is one of the objects of the present invention to overcome the before mentioned objectionable features and provide a gear pump oiler which will positively and constantly force the lubricant between the ends of the pump gears and the casing to lubricate the same.

A further object of the invention is to provide a gear pump oiler which will perform the functions desired without the use of parts other than the pump itself.

A further object of the invention is to provide a gear pump oiler which is of simple construction is strong and durable and is well adapted for the purpose described.

With the above and other objects in view the invention consists of the improved gear pump oiler and its parts and combinations as set forth in the claims, and all equivalents thereof.

In the accompanying drawing in which the same reference characters indicate the same parts in all of the views:

Fig. 1 is a vertical sectional view taken on line 1—1 of Fig. 2;

Fig. 2 is a horizontal sectional view taken on line 2—2 of Fig. 1;

Fig. 3 is a vertical sectional view taken on a larger scale on line 3—3 of Fig. 2; and Fig. 4 is an enlarged sectional of one of the pump gears.

Referring to the drawing the numeral 8 indicates a conduit casing adapted to be connected to the cylinders of a hydraulic dump truck, 9 a pump casing connected thereto and 10 the cover thereof. Said casing 9 is formed with two intersecting gear chambers 11 of which the conduit casing 8 forms one inner flat face and the cover 10 the other inner flat face thereof. The gear chambers are of circular formation and at the upper and lower points of intersection of the curves inlet and outlet openings 11 and 12 are provided which communicate with the ducts 13 and 14 of the conduit casing 8. Intermeshing pump gears 15 and 16 fit snugly within the gear chambers and have, with the exception of small hub recesses 16′, flat faces 17 which bear against the flat faces of the chambers. The gear 15 is mounted on a driving shaft 18 which extends through a stuffing nut 19 while the gear 16 is mounted on a short shaft 20 journaled within the casing. A plug 21 closes the opening in the cover 10 into which the shaft 20 extends. Each gear 15 and 16 on corresponding sides of the shafts 18 and 20 is provided with an oil duct 22 which extends through the gear in a line parallel to the axis of the shaft and at its end portions is bevelled or tapered as indicated by the numeral 22′. Each duct is also intersected by a transverse duct 23 which extends radially outwardly from the duct 22 to one of the intertooth spaces of the gear.

In operation the oil in the outlet opening 12 is under pressure due to the rotation of the gears and every time one of the ducts 23 turns into register with said outlet opening the oil under pressure will be forced through said duct and into the duct 22 to the opposite faces of the gear. Now as the intertooth space is entered by the tooth of the other gear the oil in the intertooth space will be forced through the ducts and between the faces of the gear and the casing chamber. The bevelled end portions of the ducts serve to spread the oil on the inner faces of the casing and the rotation of the gears carry the oil circumferentially around the said casing faces and also works the oil, into the hub recesses and the shaft bearings of the casing so that a constant supply of oil is fed to the bearing parts to thoroughly lubricate the same.

From the foregoing description it will be seen that the gear pump oiler is of very simple construction and is well adapted for the purpose described.

What I claim as my invention is:

1. A gear pump oiler, comprising a casing having circular intersecting gear recesses with flat side faces and inlet and outlet openings, and intermeshing gears positioned in said recesses and having flat side faces which closely fit the side faces of the casing, said gears also having transverse oil ducts which extend through the gears from one side face to the other and also other ducts which extend radially between the side faces from the transverse ducts to the peripheries of the gears to receive oil therein under pressure.

2. A gear pump oiler, comprising a casing having circular intersecting gear recesses with flat side faces and inlet and outlet openings, and intermeshing gears positioned in said recesses and having flat side faces which closely fit the side faces of the casing, said gears also having transverse oil ducts which extend through the gears from one side face to the other and have tapered end portions, said gears also having other ducts which extend from the transverse ducts radially outwardly and between the opposite faces to the intertooth spaces of the gears to receive oil therefrom under direct pressure from the intertooth spaces.

3. A gear pump oiler, comprising a conduit casing having inlet and outlet openings, a pump casing mounted thereon and having circular intersecting gear recesses, a cover mounted on the pump casing, said conduit casing and cover having flat inner faces, shafts journaled in the conduit casing and the cover and one of said shafts extending through the cover, and intermeshing gears positioned in said pump casing and having flat sides which closely fit the inner flat faces of the conduit casing and the cover, said gears having transverse oil ducts which extend through the gears from one side face to the other and also having other ducts which extend from the transverse ducts radially outwardly and between the opposite faces to intertooth spaces of the gears to receive oil therefrom under direct pressure from the intertooth spaces.

In testimony whereof, I affix my signature.

JULIUS P. HEIL.